United States Patent
Hong et al.

(10) Patent No.: US 12,055,940 B2
(45) Date of Patent: Aug. 6, 2024

(54) PATH PLANNING FOR AUTONOMOUS MOVING DEVICES

(71) Applicant: Ford Global Technologies, LLC, Dearborn, MI (US)

(72) Inventors: Sanghyun Hong, Dearborn, MI (US); Jianbo Lu, Dearborn, MI (US); Dimitar Filev, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 570 days.

(21) Appl. No.: 16/960,706

(22) PCT Filed: Jan. 24, 2018

(86) PCT No.: PCT/US2018/015047
§ 371 (c)(1),
(2) Date: Jul. 8, 2020

(87) PCT Pub. No.: WO2019/147235
PCT Pub. Date: Aug. 1, 2019

(65) Prior Publication Data
US 2020/0401148 A1    Dec. 24, 2020

(51) Int. Cl.
*B60W 10/00* (2006.01)
*B60W 60/00* (2020.01)
(Continued)

(52) U.S. Cl.
CPC ........... *G05D 1/0214* (2013.01); *B60W 10/00* (2013.01); *B60W 60/0011* (2020.02);
(Continued)

(58) Field of Classification Search
CPC .. G05D 1/0214; G05D 1/0088; G05D 1/0223; G05D 1/0246; G05D 2201/0213; G01S 17/931
See application file for complete search history.

(56) References Cited

U.S. PATENT DOCUMENTS

2010/0150458 A1* 6/2010 Angell ............... G06F 16/70
348/135
2012/0143372 A1* 6/2012 Roh ................ G05D 1/0217
901/1
(Continued)

FOREIGN PATENT DOCUMENTS

JP          2013250748    *  5/2012  ............... G05D 1/02
WO     WO2012091807     *  7/2012  ............... B25J 19/02

OTHER PUBLICATIONS

Chen, Y.F. et al., "Motion planning with diffusion maps," In: Intelligent Robots and Systems (IROS), 2016 IEEE/RSJ International Conference, Date of Conference: Oct. 9-14, 2016, pp. 1423-1430 (Year: 2016).*

(Continued)

*Primary Examiner* — Joan T Goodbody
(74) *Attorney, Agent, or Firm* — Brandon Hicks; Eversheds Sutherland (US) LLP

(57) ABSTRACT

The present invention extends to methods, systems, and computer program products for path planning for autonomous moving devices. Aspects of the invention include planning a path for a mobile robot to move autonomously in an environment that includes other static and moving obstacles, such as, for example, other mobile devices and pedestrians, without reference to a prior map of the environment. A planned path for a mobile robot can be determined, adjusted, and adapted using diffusion maps to avoid collisions while making progress towards a global destination. Path planning can include using transition probabilities between grid points to find a feasible path through parts of the environment to make progress towards the global destination. In one aspect, diffusion maps are used in combination with a receding horizon approach, including computing diffusion maps at specified time intervals.

20 Claims, 11 Drawing Sheets

(51) Int. Cl.
*G01C 21/00* (2006.01)
*G01S 13/931* (2020.01)
*G01S 17/931* (2020.01)
*G05D 1/00* (2006.01)

(52) U.S. Cl.
CPC ........ *G01C 21/3841* (2020.08); *G01S 13/931* (2013.01); *G01S 17/931* (2020.01); *G05D 1/0088* (2013.01); *G05D 1/0223* (2013.01); *G05D 1/0246* (2013.01)

(56) References Cited

U.S. PATENT DOCUMENTS

| | | | |
|---|---|---|---|
| 2015/0350843 A1* | 12/2015 | Jensen | H04M 1/72457 455/456.3 |
| 2016/0069691 A1 | 3/2016 | Fong et al. | |
| 2017/0248963 A1 | 8/2017 | Levinson et al. | |
| 2020/0401148 A1* | 12/2020 | Hong | G05D 1/0223 |

OTHER PUBLICATIONS

Chen et al. "Motion Planning with Diffusion Maps" (IROS), 2016 (Year: 2016).*
Mattingley et al. "Receding horizon control: Automatic generation of high-speed solvers." IEEE Control Systems Magazine, 31 ( Jun. 2011), pp. 52-65 (Year: 2011).*
Hong, et al. "Dynamic Diffusion Maps-based Path Planning for Real-time Collision Avoidance of Mobile Robots" 2018 IEEE Intelligent Vehicles Symposium (IV), Date Added to IEEE Xplore: Oct. 21, 2018. (Year: 2018).*
J. Mattingley, Y. Wang, and S. Boyd "Receding Horizon Control: Automatic Generation of High-Speed Solvers," IEEE Control Systems Magazine, 31(3):52-65, Jun. 2011. (Year: 2011).*
Chen, Y.F. et al., "Motion planning with diffusion maps," In: Intelligent Robots and Systems (IROS), 2016 IEEE/RSJ International Conference, Date of Conference: Oct. 9-14, 2016, Retrieved from the Internet at http://web.mit.edu/miaoliu/www/publications/IROS16.pdf on Jul. 1, 2020, believed same as Examiner's retrieval from the Internet at https://ieeexplore.ieee.org/document/7759232/ on Mar. 22, 2018, pp. 1-8.
International Search Report of the International Searching Authority for PCT/US2018/015047 dated Apr. 23, 2018.

* cited by examiner $$k(m_i, m_j) \;=\; \exp\!\left(-\frac{\|m_i - m_j\|^2}{\sigma}\right) \quad 601$$

FIG. 6A

$$K = \begin{bmatrix} k(m_1, m_1) & \cdots & k(m_1, m_n) \\ \vdots & \ddots & \vdots \\ k(m_n, m_1) & \cdots & k(m_n, m_n) \end{bmatrix} \quad 602$$

FIG. 6B

$$p_{ij} \;=\; \frac{k(m_i, m_j)}{\sum_{j=1}^{n} k(m_i, m_j)} \quad 603$$

FIG. 6C

$$P \;=\; D^{-1} K \quad 604$$

FIG. 6D

$$P^t \;=\; P \times \ldots \times P$$
$$= \begin{bmatrix} p_{11}^t & \cdots & p_{1n}^t \\ \vdots & \ddots & \vdots \\ p_{n1}^t & \cdots & p_{nn}^t \end{bmatrix} \quad 605$$

FIG. 6E

$$d_{ij}^t = \sum_{k=1}^{n}(p_{ik}^t - p_{jk}^t)^2 \quad \text{\small 606}$$

FIG. 6F

$$P' = S\Lambda S^\top \quad \text{\small 607}$$

FIG. 6G

$$P = V\Lambda V^{-1} \quad \text{\small 608}$$

FIG. 6H

$$H = V_r \Lambda_r = \begin{bmatrix} \lambda_1 v_{11} & \cdots & \lambda_r v_{1r} \\ \vdots & \ddots & \vdots \\ \lambda_1 v_{n1} & \cdots & \lambda_r v_{nr} \end{bmatrix} \quad \text{\small 609}$$

FIG. 6I

$$d_{ij}^t = \|row_i(H) - row_j(H)\|^2 \quad \text{\small 610}$$

FIG. 6J

Suppose $n$ grid points,

1    Initialize $i \leftarrow s$, $Path[0] = s$

2    While $i$ is not equal to $g$,

3        For $nb_j$ in $Neighbors(i^{th}\ grid\ point)$,

4            $D[j] = \|row_g(H) - row_j(H)\|^2$

5        End For

6        $i \leftarrow \arg\min(D)$,

7        $Path \leftarrow Path.\text{append}(i)$,

8    End while

PATH PLANNING FOR AUTONOMOUS MOVING DEVICES

CROSS-REFERENCE TO RELATED APPLICATIONS

Not applicable.

BACKGROUND

1. Field of the Invention

This invention relates generally to the field of automated devices, and, more particularly, to path planning for autonomous moving devices.

2. Related Art

Mobile robots have been developed for a wide range of applications including transportation, searching, and surveillance. To help ensure mobile robots travel in a safe manner, mobile robots can adapt travel paths for changing environments, such as, for example, streets with newly constructed buildings, other moving obstacles, etc. Mobile robots can store a map of an operating area and navigate pre-defined navigation routes through the operating area or change routes as they see fit.

BRIEF DESCRIPTION OF THE DRAWINGS

The specific features, aspects and advantages of the present invention will become better understood with regard to the following description and accompanying drawings where:

FIGS. 6A-6J illustrate example equations for computing diffusion maps.

DETAILED DESCRIPTION

The present invention extends to methods, systems, and computer program products for path planning for autonomous moving devices. Mobile devices, and in particular mobile robots, have been pursued for various applications including logistic robots, home robots, automated guided vehicles, and delivery robots. Depending on the type and configuration of a mobile robot, the mobile robot can transport goods or freights as an alternative to transporting goods or freights manually by human movers. Mobile robots can navigate pre-defined navigation routes or change a route as they see fit.

Using a prior map of an operating area, path planning for mobile robots can be based on a variety of different algorithms. Path planning algorithms can find minimum cost paths within a fixed graph. To account for changes in environment, existing paths can be incrementally repaired from previous paths. Some path planning algorithms find a suboptimal path quickly and then refine the suboptimal path into a more optimal path. Path planning algorithms can also use policies generated through reinforcement learning to avoid collisions based on a planned path with diffusion maps.

Aspects of the invention include planning a path for a mobile robot to move autonomously in an environment that includes other moving objects, such as, for example, other mobile devices and pedestrians, without reference to a prior map of the environment. A planned path for a mobile robot can be determined, adjusted, and adapted to avoid collisions in a dynamic environment while making progress towards a destination.

A mobile robot can travel in an environment from an origin to a destination using diffusion maps. Sensors attached to the mobile robot can collect sensor data of an area around the mobile robot (i.e., for part of the environment). A grid map for the area can be formulated from the collected sensor data. The grid map can include a plurality of grid points. An underlying geometry (manifold) of the grid map can be determined for the area.

Path planning can include using transition probabilities between grid points to find a feasible path through the area to make progress towards the destination. In one aspect, diffusion maps are used in combination with a receding horizon approach, including computing a diffusion map at specified intervals. Using diffusion maps with a receding horizon approach essentially eliminates the need for storage of a prior map.

Figure 1:
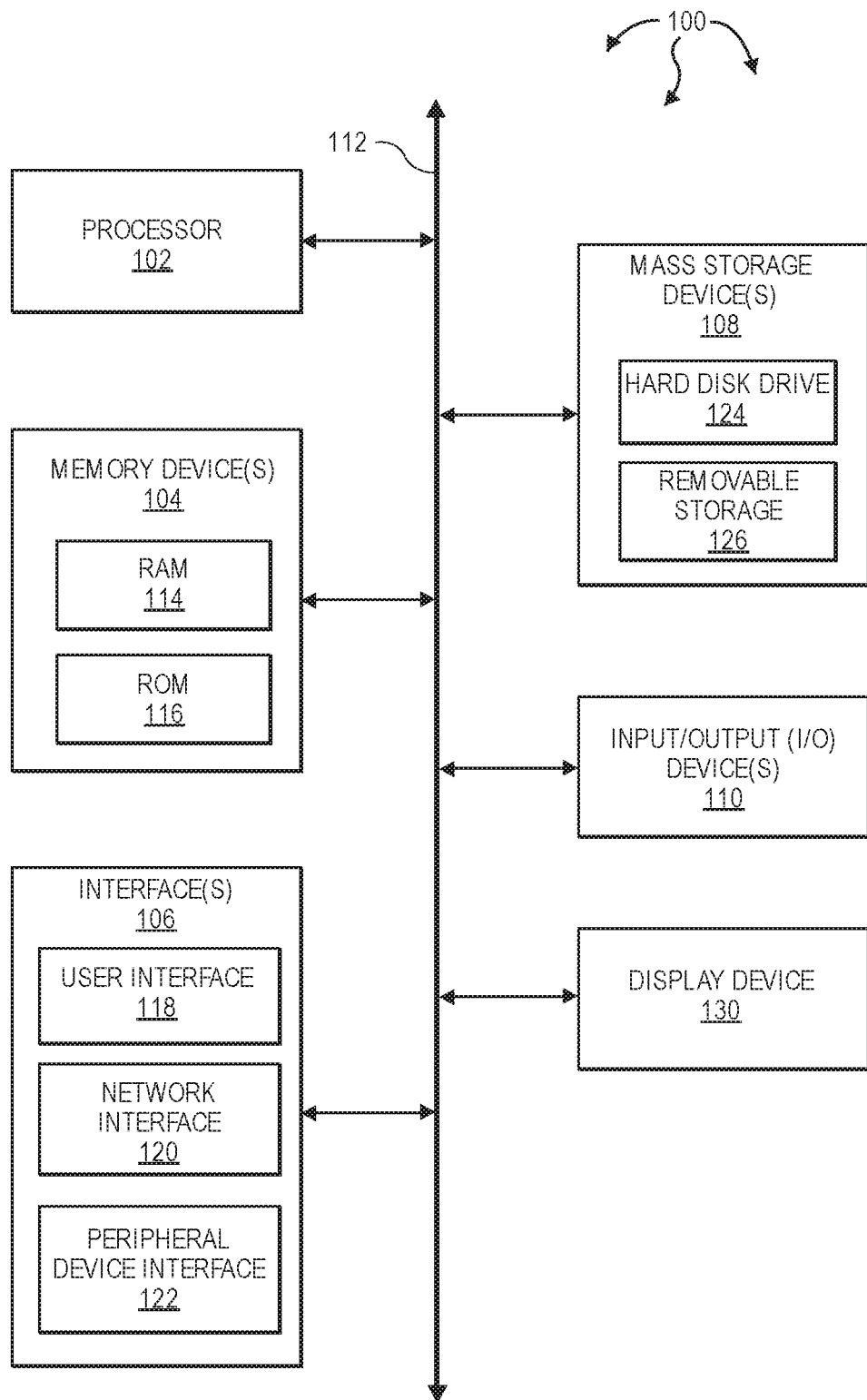
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

In this description and the following claims, a "diffusion map" is defined as a dimensionality reduction or feature extraction from a more complex space which computes a family of embeddings of a data set into a Euclidean space (e.g., lower-dimensional or less complex). Coordinates in an embedded space of the data set can be computed from eigenvectors and eigenvalues of a diffusion operator on the data. In general, the Euclidean distance between points in the embedded space is equal to the "diffusion distance" between probability distributions centered at those points. Determining an embedded space can include discovering the underlying manifold that the data has been sampled from. By integrating local similarities at different scales, diffusion maps can give a global description of a data set.

In this description and the following claims, a "receding horizon control" (or "model predictive control") is defined as a control scheme for repeatedly solving a constrained optimization problem (e.g., at specified time intervals). Receding horizon control can use predictions of future costs, disturbances, and constraints over a moving time horizon to choose a control action. Receding horizon control can handle constraints, such as, limits on control variables, to generate feed-forward actions.

Figure 2:
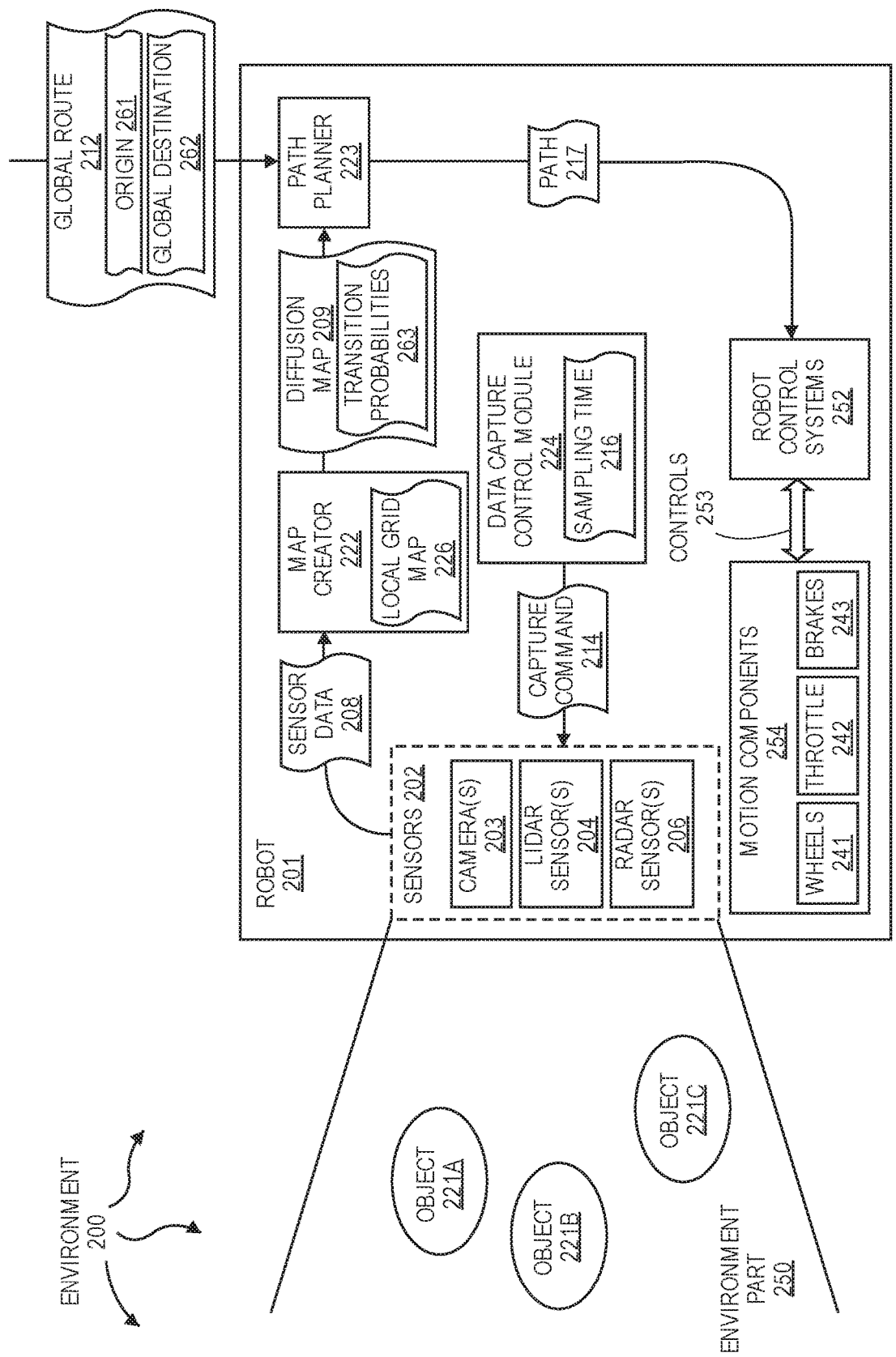
FIG. 2 illustrates an example computer architecture that facilitates planning a path for a mobile robot.

FIG. 2 illustrates an example environment 200 that facilitates planning a path for a mobile robot. Environment 200 includes mobile robot 201 and objects 221A, 221B, and 221C. Mobile robot 201 can be a mobile autonomous ground based robot and can include any of the components described with respect to computing device 100. In one aspect, mobile robot 201 is approximately the size of a person or smaller. Mobile robot 201 may carry cargo and/or passengers. Each of objects 221A, 221B, and 221C can be a stationary or mobile object, such as, for example, a pedestrian, a bicycle, another mobile robot, a vehicle, a sign, a building, a tree, a bush, a roadway barrier, or other type of object. Mobile robot 201 can move within environment 200 to navigate from an origin to a destination in environment 200. Environment 200 may be and/or include interconnected portions of: a roadway, an intersection, a parking lot, a bike path, a trail, a pedestrian walkway, a cross walk, a sidewalk, a hallway, a corridor, etc.

In one aspect, environment 200 includes one or more static objects as well as one or more mobile objects (in addition to mobile robot 201). Mobile robot 201 is configured to adaptively navigate around the one or static objects and one or more mobile objects to move from an origin in environment 200 to a destination in environment 200.

As depicted, mobile robot 201 includes sensors 202, map creator 222, path planner 223, data capture control module 224, robot control systems 252, and motion components 254. Each of sensors 202, map creator 222, path planner 223, data capture control module 224, robot control systems 252, and motion components 254, as well as their respective components can be connected to one another over (or be part of) a network, such as, for example, a PAN, a LAN, a WAN, a controller area network (CAN) bus, and even the Internet. Accordingly, each of sensors 202, map creator 222, path planner 223, data capture control module 224, robot control systems 252, and motion components 254, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Sensors 202 further include camera(s) 203, LIDAR sensor(s) 204, and Radar sensor(s) 206. Camera(s) 203, LIDAR sensor(s) 204, and Radar sensor(s) 206 can capture images of and/or sense other objects (e.g., objects 221A, 221B, and 221C) in environment 200. Sensors 202 can capture images in different portions of the light spectrum including the visible light spectrum and the InfraRed (IR) spectrum.

Sensors 202 can be configured to sense objects 360 degrees around mobile robot 201. Sensors 202 can be configured to face in different directions, such as, for example, in a direction of travel (e.g., front), away from a direction of travel (e.g., rear), and essentially perpendicular to a direction of travel (e.g., each side), to provide 360-degree coverage. In some aspects, a sensor changes orientation based on movement of mobile robot 201. For example, if mobile robot 201 reverses direction, a front facing sensor can become a rear facing sensor and vice versa. If mobile robot 201 turns, a side facing sensor can become a front facing or rear facing sensor. The number and configuration of sensors 202 can be based on sensing ranges and angles of individual sensors as well as a desired precision of navigation (e.g., within environment 200). Accordingly, sensors 202 can capture sensor data for part of environment 200 by sensing the part of environment 200 (e.g., out to the sensor range of sensors 202).

Map creator 222 is configured to create a diffusion map for part of environment 200 from captured sensor data for the part of environment 200. A created diffusion map represents a local subset of environment 200 around mobile robot 201 (a less complex space) within environment 200 (a more complex space).

Map creator 222 can construct a local grid map 226 based on captured sensor data, distance to obstacles (e.g., objects 221A, 221B, and 221C), and angles of laser beams. The local grid map 226 can include a plurality of local grid points representing a subset of grid points from environment 200. Map creator 222 can then create a diffusion map corresponding to local grid map points.

Path planner 223 is configured to determine a path within the plurality of local grid points to make progress towards a global destination. Path planner 223 can receive a global route (e.g., via wireless communication) from a controlling entity, such as, an owner or operator of mobile robot 201. The global route can indicate a global origin in environment 200 (e.g., a starting location of mobile robot 201) and a global destination in environment 200. The global route may also identify known static obstacles in environment 200. Path planner 223 can use a diffusion map corresponding to a plurality of local grid map points and information from a global route to plan a path through the plurality of local grid map points that makes progress towards the global destination.

In one aspect, the current location of mobile robot 201 (which may or may not be the starting location) is a grid point within a plurality of local grid points used to create a diffusion map. Path planner 223 identifies another (neighboring) grid point having the smallest diffusion distance from the current location of mobile robot 201. Path planner 223 then plans a path for mobile robot 201 to travel from the current location to the other grid point. A neighboring grid point can be any grid point within the plurality of local grid points.

In general, robot control systems 252 include an integrated set of control systems for fully autonomous movement of mobile robot 201. For example, robot control systems 252 can include a throttle control system to control throttle 242, a steering system to control wheels 241, a collision avoidance system to control brakes 243, etc. Robot control systems 252 can receive input from other components of mobile robot 201 (including path planner 223) and can send automated controls 253 to motion components 254 to control movement of mobile robot 201. For example, motion components 254 can send automated controls 253 to brake, slow down, accelerate, turn, etc., mobile robot 201. The automated controls can cause mobile robot 201 to follow a path through a local grid map to make progress towards a global destination while avoiding other sensed objects.

Data capture control module 224 is configured to control when sensors 202 capture sensor data. For example, data capture control module 224 can instruct sensors 202 to capture sensor data at specified time intervals in accordance with sampling time 216. Sampling time 216 can range from micro seconds to seconds. In one aspect, sample time 216 is in a range from 10 milliseconds to 1 second. Sampling time 216 can be tailored for efficient and safe travel through environment 200 without overloading the computing resources of mobile robot 201. As such, sampling time 216 can be configured based on the computing resources of mobile robot 201, number and density of obstacles in environment 200, number and density of dynamic obstacles in environment 200, configuration and range of sensors 202, etc.

In one aspect, sampling time 216 can be changed as appropriate to adjust for navigation in different environments. For example, sampling time 216 can be received (e.g., via wireless communication) from a controlling entity, such as, an owner or operator of mobile robot 201. Sampling time 216 can be included in a global route.

Figure 3:
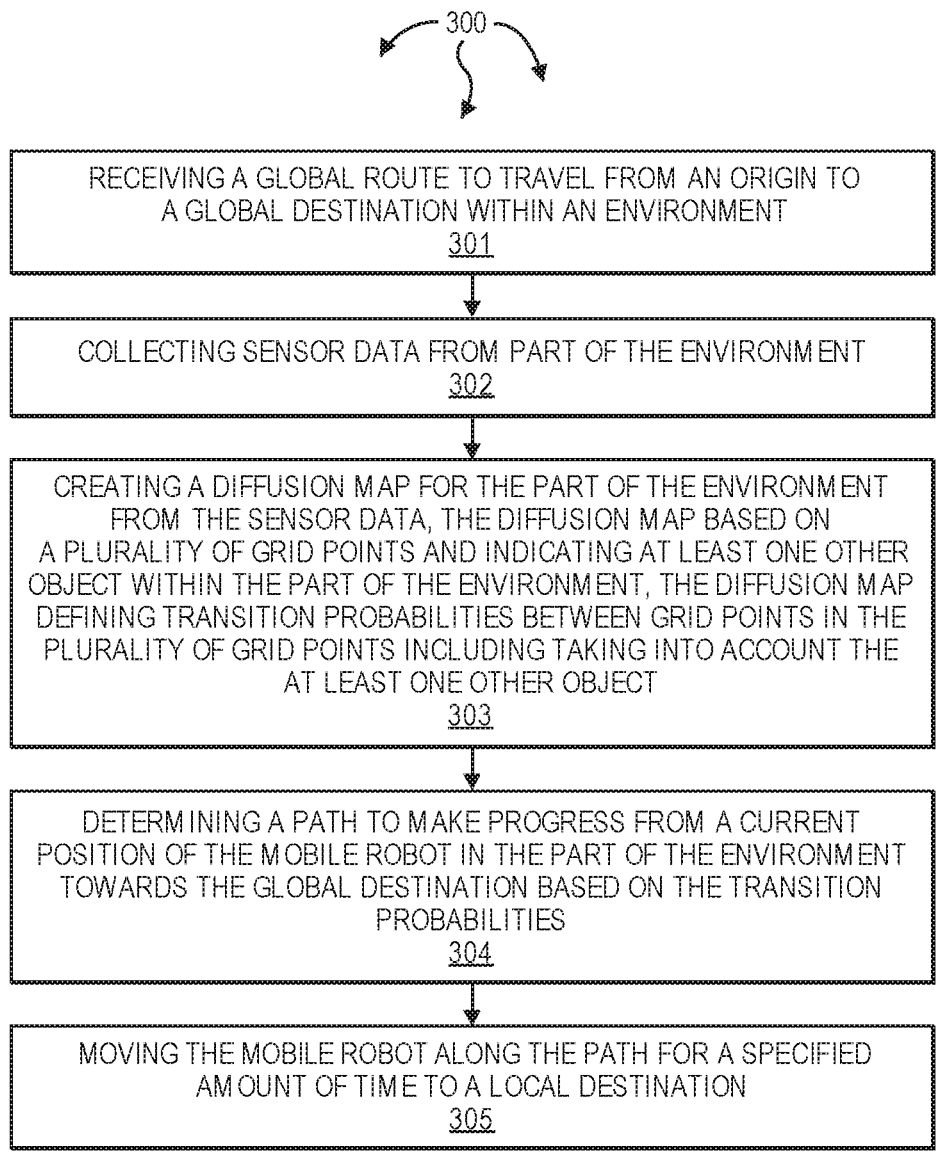
FIG. 3 illustrates a flow chart of an example method for planning a path for a mobile robot.

FIG. 3 illustrates a flow chart of an example method 300 for planning a path for a mobile robot. Method 300 will be described with respect to the components and data of mobile robot 201.

Method 300 includes receiving a global route to travel from an origin to a global destination within an environment (301). For example, path planner 223 can receive global route 212. Global route 212 can identify a global path from origin 261 within environment 200 (e.g., the starting location of robot 201) to global destination 262 within environment 200 (e.g., the terminal or ending location of mobile robot 201). Global route 212 may also include one or more known obstacles in environment 200 and/or sampling time 216.

Method 300 includes collecting sensor data from part of the environment (302). For example, in accordance with a time interval based on sampling time 216, data capture control module 224 can send capture command 214 to sensors 202. In response, sensors 202 can capture sensor data 208 (e.g., including images, LIDAR returns, Radar returns, etc.) for environment part 250. Sensors 202 can detect objects 221A, 221B, and 221C within environment part 250. Sensor data 208 can indicate that objects 221A, 221B, and 221C were detected.

Method 300 includes creating a diffusion map for the part of the environment from the sensor data, the diffusion map based on a plurality of grid points and indicating at least one other object within the part of the environment, the diffusion map defining transition probabilities between grid points in the plurality of grid points including taking into account the at least one other object (303). For example, map creator 222 can create diffusion map 209 for environment part 250 from sensor data 208. Map creator 222 can formulate local grid map 226 for environment part 250 based on sensor data 208. Local grid map 226 can include a plurality of grid points and can indicate the location of objects 221A, 221B, and 221C within the plurality of grid points. Map creator 222 can create diffusion map 209 from local grid map 226. Diffusion map 209 represents diffusion distances and defines transition probabilities 263 between grid points in local grid map 226 taking into account the location of objects 221A, 221B, and 221C.

Method 300 includes determining a path to make progress from a current position of the mobile robot in the part of the environment towards the global destination based on the transition probabilities (304). For example, path planner 223 can formulate path 217 to make progress from a current position of mobile robot 201 in environment part 250 towards global destination 262 based on transition probabilities 263.

Method 300 includes moving the mobile device along the path for a specified amount of time to a local destination (305). For example, robot control systems 252 can send controls 253 to motion components 254 based on path 217. Controls 253 can cause motion components 254 to move mobile robot 201 along path 217 making progress towards global destination 262. Movement along path 217 may cause mobile robot 201 to deviate from global route 212.

Upon a next interval in accordance with sampling time 216, acts 302, 303, 304, and 305 can be repeated. For example, data capture control module 224 can again send capture command 214 to sensors 202 (after mobile robot 201 has moved for some amount of time along path 217). Additional sensor data can be captured for a different part of environment 200. Map creator 222 can use the additional sensor data to create a new local gird map and corresponding new diffusion map with new transition probabilities. Path planner 223 can use the new diffusion map and new transition probabilities to plan a new path from the current location of mobile robot 201 (reached after moving for some amount of time along path 217) to make additional progress towards global destination 262.

Between time intervals, movement of mobile robot 201 as well as other dynamic objects can cause obstacles to come into and out of range of sensors 202. At each interval, captured sensor data can be used to plan a new path for mobile robot 201 to make progress towards global destination 262 while avoiding obstacles in a locally sensed part of environment 200. A path through a different locally sensed part of environment 200 may cause mobile robot 201 to deviate from global route 212.

Accordingly, aspects of the invention can plan paths to avoid collisions in parts of a dynamic environment while trying to make progress toward a (e.g., global) destination in the dynamic environment. To plan paths avoiding collisions, an underlying geometry of a grid map can be determined. Diffusion maps can be used for path planning based on transition probabilities between grid points to find a feasible path through (e.g., a locally sensed) part of an environment. Diffusion maps can be supplemented with a receding horizon approach including creating a diffusion map at specified time intervals. Using a receding horizon, a mobile robot can navigate from a starting location to a global destination without reference to a global map.

Figure 4:
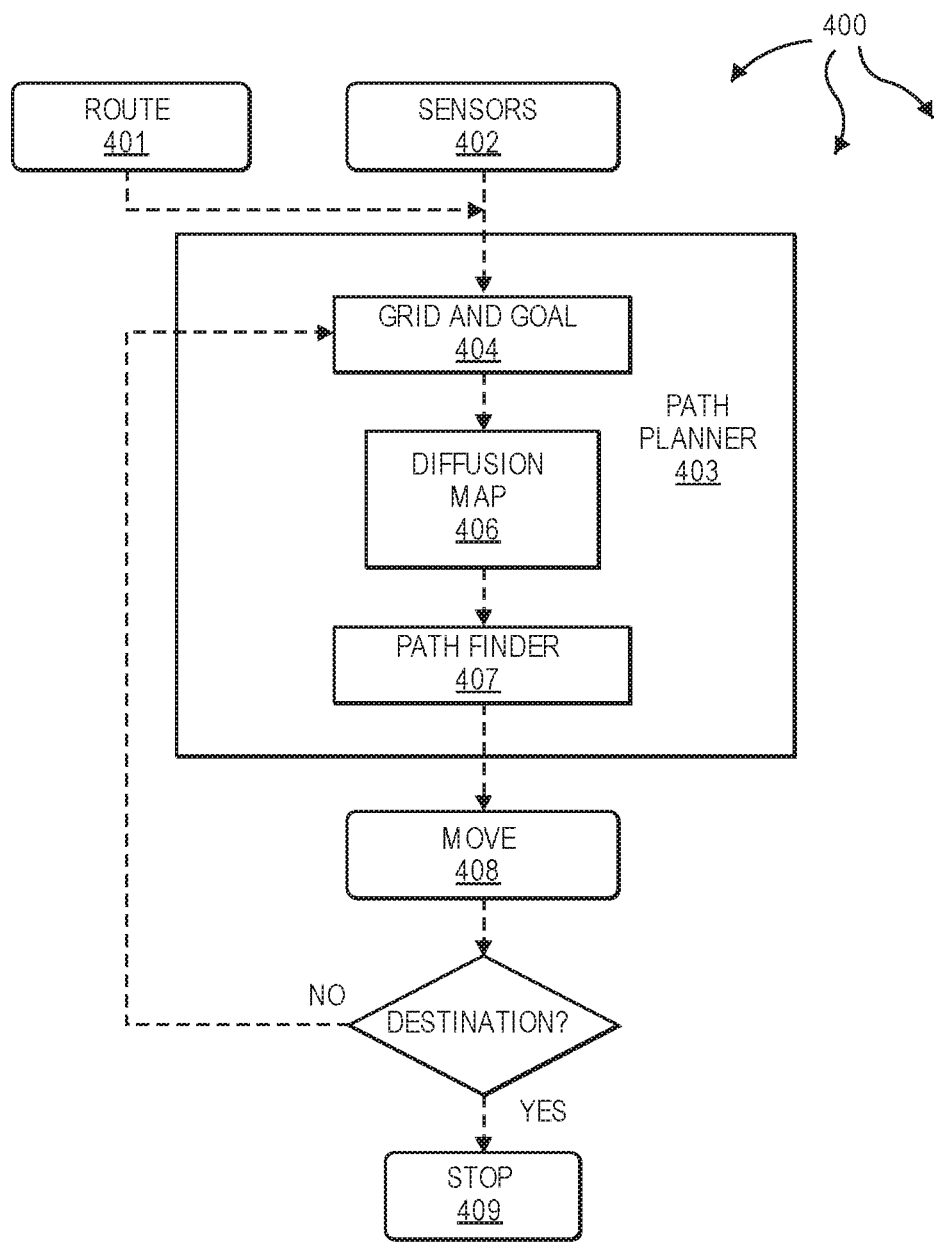
FIG. 4 illustrates an example data flow for collision avoidance based on diffusion maps.
Figure 5:
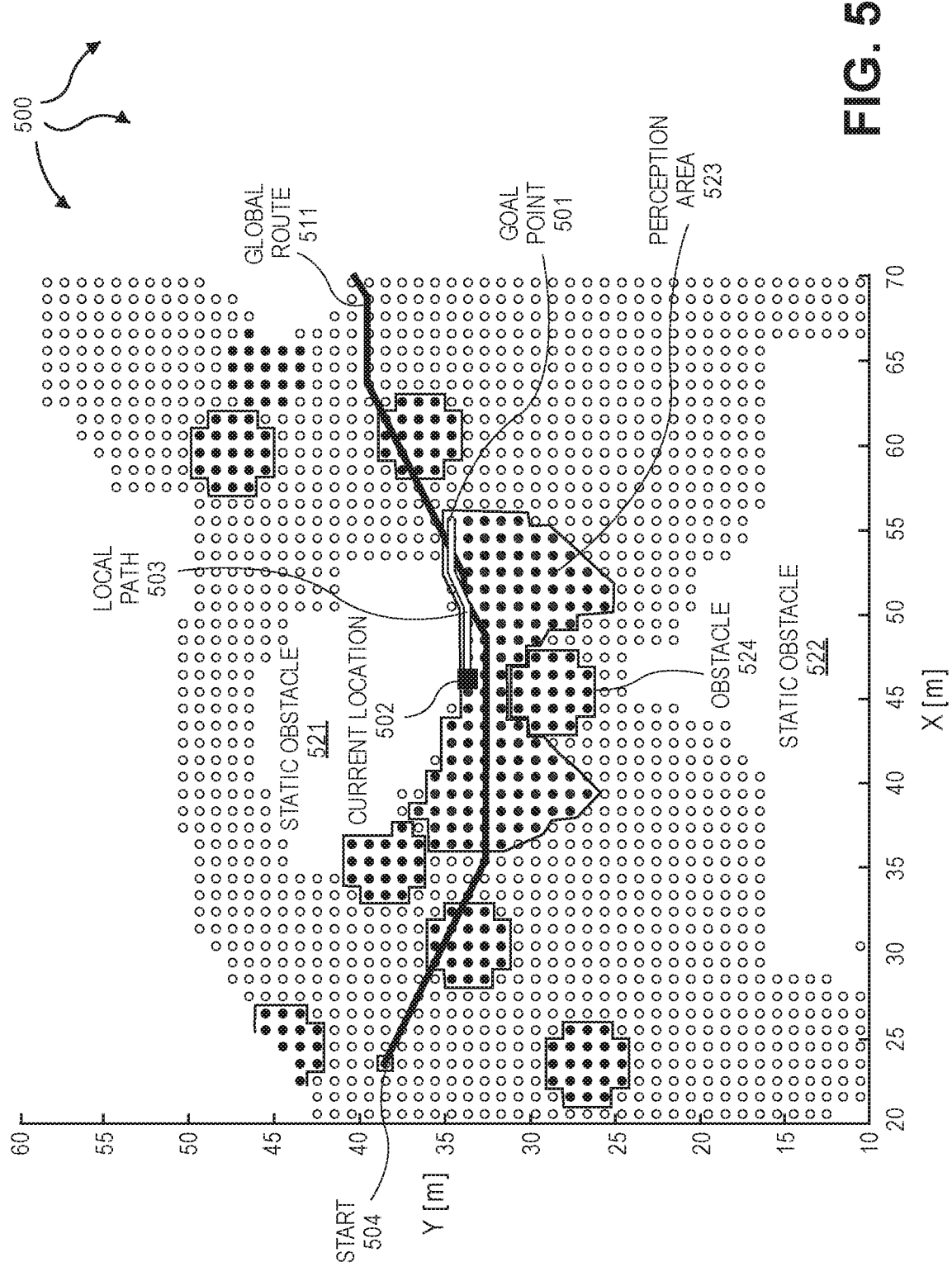
FIG. 5 illustrates an example of a zoomed in portion of a grid map including a goal point.

FIG. 4 illustrates an example data flow 400 for collision avoidance based on diffusion maps. Components depicted in data flow 400 can be included in a mobile robot and used to move the mobile robot towards a global destination within an environment. FIG. 5 illustrates an example zoomed in portion of grid map 500 including start 504, current location 502, goal point 501, and global route 511. A mobile robot including the components of data flow 400 can be located at current location 502.

The mobile robot can receive route 401 including a pre-planned route to a destination (e.g., a global route) within the environment. Route 401 can be created based on knowledge of a starting location (e.g., start 504) and a global destination in the environment. However, a creator of route 401 (e.g., an owner or operator of a mobile robot) may not be aware of some or all of the static objects in the environment. Further, the creator of route 401 may not be able to plan for dynamic objects entering and/or leaving the environment.

As such, sensors 402 can be used to sense perception area 523 around the mobile robot as the mobile robot moves towards the global destination. Generally, path planner 403 can determine a grid point in perception area 523 that has the smallest distance to global route 511 and furthest distance from current location 502. As depicted, path planner 403 includes grid and goal 404, diffusion map 406, and path finder 407.

Grid and goal 404 can use sensor signals to create a local grid map and determine a local goal point. Generally, perception area 523 represents a local grid map (e.g., similar to local grid map 226) of an area around the mobile robot. Within perception area 523, local path 503 is indicated from current location 502 to goal point 501. Zoomed in portion of grid map 500 also indicates global route 511.

Generally, within grid map 500, static obstacles 521 and 522 can be known to the creator of global route 511. Within zoomed in portion of local grid map 500, additional (static and/or dynamic) obstacles can be detected from sensed data including distance to obstacles, angles or laser beams, etc. For example, sensors 402 can sense additional obstacles, including obstacle 524.

To generate local path 503, diffusion map 406 can determine a geometry or underlying manifold for grid points in perception area 523 (i.e., the local grid map). Diffusion map 406 can compute diffusion maps corresponding to grid map points in perception area 523. To create diffusion maps a diffusion process can be used. That is, each map grid point is regarded as a state and transition probabilities between grid points are defined. Transition probabilities can be calculated based on a diffusion kernel which provides local similarly measures.

Turning to FIGS. 6A-6J, diffusion map 406 can implement equations 601-610 to compute diffusion maps (e.g., for grid map points in perception area 523). FIG. 6A depicts an equation 601 for an example Gaussian diffusion kernel where $m_i$ and $m_j$ are the position vectors representing the $i^{th}$ and $j^{th}$ grid points, respectively, and $\sigma$ is the variance parameter. Then, the kernel matrix K can be defined as depicted by equation 602 in FIG. 6B, wherein n represents the number of map grid points. The probability $p_{ij}$ of transition from $m_i$ to $m_j$ can be calculated using equation 603 in FIG. 6C.

Based on the transition probabilities, a diffusion matrix P of size n×n can be constructed. Denoting a diagonal matrix, whose diagonal elements are $1/\Sigma_{j=1}^{n} k(m_i, m_j)$, as $D^{-1}$, a diffusion matrix is expressed according to equation 604 in FIG. 6D. When the diffusion process runs forward t steps, the t-step diffusion matrix is given as depicted in equation 605 in FIG. 6E. Thus, an element $^t_{ij}$ represents the sum of probabilities of paths reachable from $m_i$ to $m_j$ after t step transitions. The diffusion distance between $m_i$ and $m_j$ can be defined with the t-step diffusion matrix represented by equation 606 in FIG. 6F.

The diffusion distance becomes small when $p^t_{ik}$ and $p^t_{jk}$ are roughly equal, for example, when $m_i$ and $m_j$ are well connected via $m_k$. Thus, a diffusion distance implies the distance measured along the underlying geometry (or manifold) of map grid points. A diffusion distance can be approximated through dimensionality reduction which transforms n-dimensional space into r(<n)-dimensional space (i.e., a diffusion space). With a symmetric matrix $P'=D^{1/2}PD^{-1/2} D^{-1/2}KD^{-1/2}$ defined, there exists the orthonormal eigenvectors of P' exhibiting the properties of equation 607 in FIG. 6G where S represents the orthogonal eigenvector matrix and $\Lambda=\text{diag}(\{\lambda_k\}_{k=1\ldots n})$ represents the eigenvalue matrix, respectively. Then, a diffusion matrix P can be represented through equation 608 in FIG. 6H, where $V=D^{-1/2}S$ is the right eigenvector matrix of P and $V^{-1}=S^T D^{1/2}$ is the left eigenvector matrix of P.

By selecting the r dominant eigenvalues among $\lambda_1 > \ldots > \lambda_r \gg \lambda_n$, a matrix H is defined as depicted in equation 609 in FIG. 6I, where $\Lambda_r=\text{diag}(\{\lambda_k\}_{k=1\ldots r})$ has the dominant r eigenvalues and $V_r$ only contains the first r column vectors of V. The row space of H represents the diffusion maps. The diffusion distance is equivalent to the Euclidean distance in the r-dimensional space as indicated in equation 610 in FIG. 6J, where $\text{row}_i(H)$ and $\text{row}_j(H)$ represent the $i^{th}$ and $j^{th}$ row vectors of H.

Accordingly, in path planning, diffusion map 406 can find the map grid point $m_j$, which is closet to $m_i$ in regard to the diffusion distance (i.e., the smallest $d^t_{ij}$ in equation 610, recursively until a goal point is reached). Thus, diffusion map 406 can produce the diffusion maps matrix, H in equation 609, whose row space has the reduced dimensionality of r. The Euclidean distance in the row space of H in equation 610 is essentially equivalent to the diffusion distance in equation 606, indicating underlying geometric connectivity between map grid points. Therefore, to plan a path, diffusion map 406 can find the grid point with the smallest value for equation 610 with respect to the current grid point in the next subsection of global route 511.

It may be that the $g^{th}$ row of the diffusion maps matrix H in equation 609 corresponds to goal point 501 and the $s^{th}$ row corresponds to current location 502. Neighbors of a grid point can be defined as other perceptible grid points within a circle of radius R centered at the grid point (or in perception area 523). A full circle of neighbor grid points may not be perceivable due to obstacles. For example, static obstacle 521 and obstacle 524 block perception of some grid points when sensors 402 are used at current location 502.

From neighbor grid points (i.e., grid points in perception area 523), path finder 407 can compute diffusion distances to goal point 501 based on equation 610. Path finder 407 can use the row vectors of H corresponding to the neighbor grid points and the $g^{th}$ row vector of H corresponding to the goal point. Among the neighbor grid points, the grid point with the smallest diffusion distance is selected as the next grid point. Move 408 can then move the mobile robot towards goal point 501. If goal point 501 is a global destination (YES), the process stops 409. If goal point 501 is not a global destination (NO), the process repeats from grid and goal 404.

The process can be repeated at specified times. For example, the process can be repeated once the mobile robot reaches the goal point or after a mobile robot has moved toward a goal point for a specified interval. The process can be repeated until a global destination is reached.

In one aspect, once local path 503 is planned, moving 408 can move the mobile robot along local path 503 for a sampling time unit T. The heading vector can be calculated with the first and second grid points of the planned local path, and the mobile robot moves in the heading direction for time T at a speed of V. After moving by distance V*T in the heading direction, the process repeats for the new position from grid and goal 404. Thus, local path 503 can be viewed as a predicted path for a receding horizon to be followed by the mobile robot from the current position. Local path 503 avoids collisions with obstacles because the constructed grid map has already excluded areas occupied by obstacles.

Figure 7:
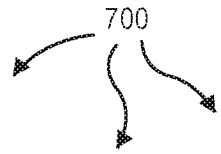
FIG. 7 illustrates an example algorithm for finding a local path from a start point to a local goal point.

FIG. 7 illustrates an example algorithm 700 for finding a local path from a start point to a local goal point.

Figure 8A:
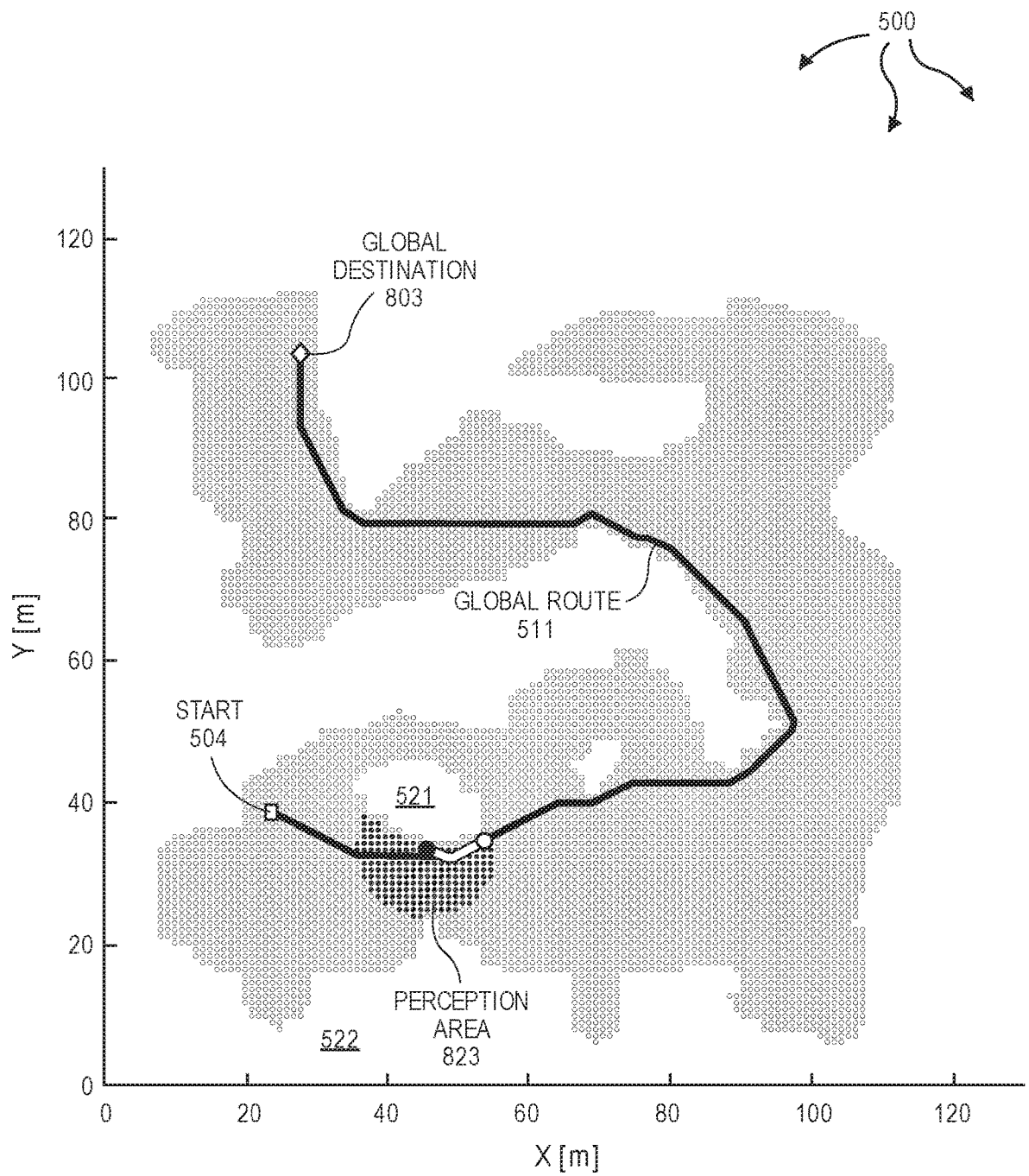
FIGS. 8A-8C illustrate an example of moving a mobile robot from an origin to a global destination through the grid map of FIG. 5.
Figure 8B:
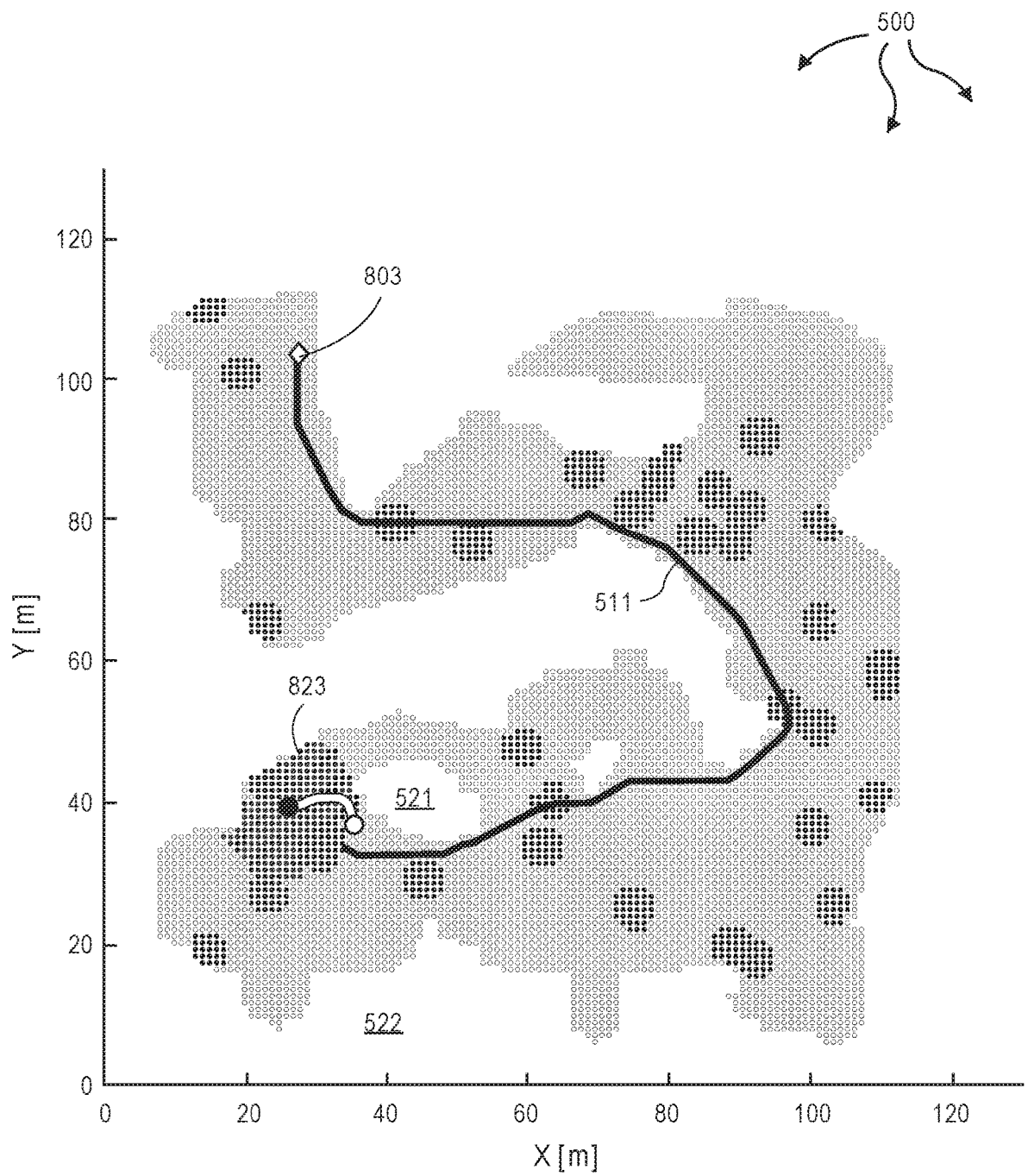
Figure 8C:
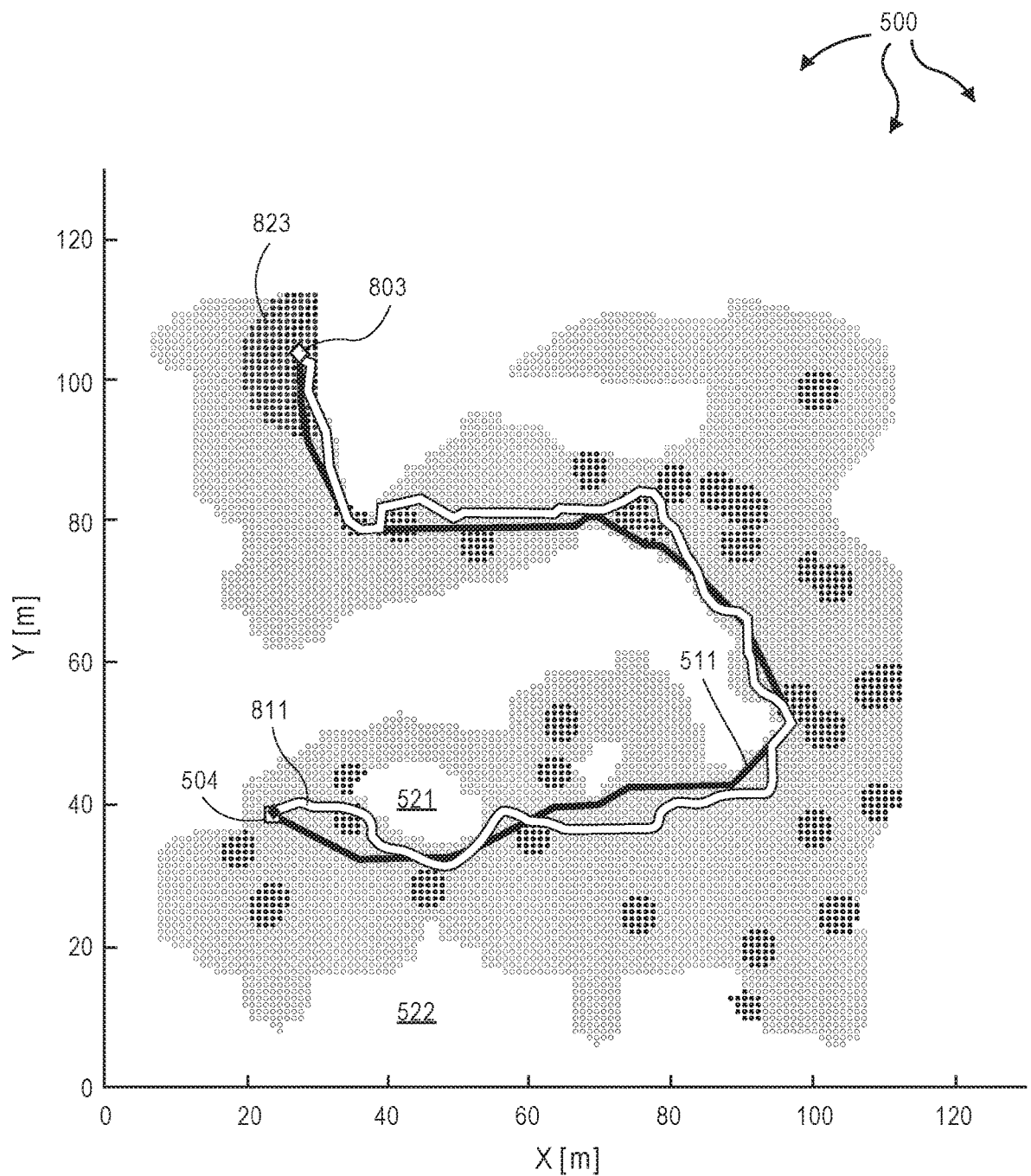

FIGS. 8A-8C illustrate an example of moving a mobile robot from start 504 to global destination 803 through grid map 500. Initially, global route 511 is received, for example, at path planner 223, path planner 403, or another similar module. FIG. 8A depicts global route 511 through grid map 500. Global route 511 is essentially a proposed route to travel from start 504 to global destination 803 based on (possibly incomplete) knowledge of a route creator (e.g., an owner or operator of the mobile robot). As the mobile robot makes progress towards global destination 803, perception area 823 sensed by robot sensors can similarly move (of which perception area 523 is an example). Within each perception area 823, static and/or dynamic obstacles can be sensed. In one aspect, the perception area 823 is configured to be around 10 meters (e.g., R=10 meters).

Within each perception area 823, algorithm 700 can implement equations 601-610 to determine a local goal point and plan a local path. In one aspect, in the computation of diffusion maps, less than all (e.g., half) of the total grid points are used for transition steps. For example, t=n/2 in equation 605. In another aspect, dimensionality is reduced, for example, to 10% of the original dimensionality. That is, r=0.1n in equation 609. In further aspects, a radius of less than the full perception range of robot sensors is used to determine neighbor grid points. For example, sensors may have a perception range of 10 meters but a radius of 2 meters is used to detect neighbor grid points.

Within FIG. 8A, white areas are known static obstacles (including previously labeled static obstacles 521 and 522). As a mobile robot moves in grid map 500, the mobile robot can sense other static and/or dynamic obstacles. As represented by the darker grid points, FIG. 8B depicts additional obstacles in grid map 500 that can be sensed as the mobile robot makes progress towards global destination 803. The mobile robot can sense additional obstacles within a perception range 823. Other obstacles may not be sensed by the mobile robot.

Sensed obstacles can be assigned an estimated radius. Dynamic obstacles can be assigned an estimated speed. For example, walking pedestrians can be assigned a radius of 2-5 meters and a speed of 0.5-2 meters/second. Although dynamic obstacles can move in random directions, radii and speeds of obstacles as well as sampling time can be tailored per environment to facilitate collision avoidance.

Due to obstacle avoidance, the mobile robot can deviate from global route 511 when moving from start 504 to global destination 803. Avoidance of static and/or dynamic obstacles can cause deviations. FIG. 8C depicts an actual route 811 of the mobile robot relative to global route 511. Accordingly, a mobile robot can travel a series of local paths to make continual progress towards a global destination while avoiding collisions with static and dynamic obstacles in an environment.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, sensors data, diffusion maps, transition probabilities, global routes, paths, capture commands, robot control commands, sampling times, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, sensors data, diffusion maps, transition probabilities, global routes, paths, capture commands, robot control commands, sampling times, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

The invention claimed is:

1. At a mobile device, a method comprising:
   collecting sensor data from part of an environment between an origin and a destination of the mobile device;
   creating a diffusion map from the sensor data, the diffusion map based on a plurality of grid points and indicating an object within the part of the environment, the diffusion map defining transition probabilities between grid points in the plurality of grid points;

determining a path within the part of the environment to make progress towards the destination based on transition probabilities in the diffusion map and application of a receding horizon control procedure each time after the mobile device has moved for a specified period of time at a specified speed towards the destination, wherein the receding horizon control procedure involves using predictions of future costs, disturbances, and/or constraints over a moving time horizon to choose a control action;

assigning to the object, an estimated radius that is less than a perception range of one or more sensors of the mobile robot;

avoiding a collision with the object based on the estimated radius; and moving the mobile robot along the path to a local destination.

2. The method of claim 1, wherein creating a diffusion map from the sensor data comprises generating a local grid map for the part of the environment, and wherein application of the receding horizon control procedure comprises a prediction of future costs, disturbances, and constraints over a moving time horizon to choose a control action.

3. The method of claim 1, wherein creating a diffusion map from the sensor data comprises:
   detecting an obstacle within a perception range of one or more sensors attached to the mobile device;
   assigning, to the obstacle, an estimated radius that is smaller than the perception range of the one or more sensors; and
   detecting a neighboring grid point by using the estimated radius.

4. The method of claim 3, wherein moving the mobile device along the path comprises avoiding the obstacle.

5. A method for moving a mobile robot from an origin towards a global destination within an environment, the method comprising:
   collecting sensor data from a part of the environment;
   creating a diffusion map for the part of the environment from the sensor data, the diffusion map based on a plurality of grid points and indicating an object within the part of the environment, the diffusion map defining transition probabilities between grid points in the plurality of grid points;
   determining a path to make progress from a current position of the mobile robot in the part of the environment towards the global destination based on the transition probabilities in the diffusion map and application of a receding horizon control procedure each time after the mobile robot has moved for a specified period of time at a specified speed towards the global destination, wherein the receding horizon control procedure involves using predictions of future costs, disturbances, and/or constraints over a moving time horizon to choose a control action;
   assigning to the object, an estimated radius that is less than a perception range of one or more sensors of the mobile robot;
   avoiding a collision with the object based on the estimated radius; and
   moving the mobile robot along the path to a local destination.

6. The method of claim 5, further comprising after moving the mobile robot along the path to the local destination:
   collecting other sensor data from another part of the environment;
   creating another diffusion map for the other part of the environment from the other sensor data, the other diffusion map including another plurality of grid points, the other diffusion map defining other transition probabilities between grid points in the other plurality of grid points;
   determining another path to make progress from the local destination towards the global destination based on the other transition probabilities; and
   moving the mobile robot along the other path to another local destination.

7. The method of claim 5, wherein determining a path to make progress from a current position of the mobile robot towards the global destination comprises finding a neighbor grid point with a smallest diffusion distance from current position.

8. The method of claim 5, wherein determining a path to make progress from a current position of the mobile robot towards the global destination comprises determining a path that avoids a collision with the object.

9. The method of claim 8, wherein determining a path that avoids a collision with the object comprises determining a path that avoids a collision with a moving obstacle.

10. The method of claim 8, wherein moving the mobile robot along the path comprises moving the mobile robot around the object.

11. The method of claim 5, wherein moving the mobile robot along the path comprises controlling one or more of: a wheel, a throttle, or a brake at the mobile robot to move the mobile robot along the path.

12. A mobile robot, the mobile robot comprising:
    a processor; and
    system memory coupled to the processor and storing instructions configured to cause the processor to:
    collect sensor data from part of an environment;
    create a diffusion map for the part of the environment from the sensor data, the diffusion map based on a plurality of grid points and indicating an object within the part of the environment, the diffusion map defining transition probabilities between grid points in the plurality of grid points;
    determine a path to make progress from a current position of the mobile robot in the part of the environment towards a global destination based on transition probabilities in the diffusion map and application of a receding horizon control procedure each time after the mobile robot has moved for a specified period of time at a specified speed towards the global destination, wherein the receding horizon control procedure involves using predictions of future costs, disturbances, and/or constraints over a moving time horizon to choose a control action;
    assign an estimated radius to the object;
    avoid colliding with the object based on the estimated radius; and
    control motion components of the mobile robot to move the mobile robot along the path to a local destination.

13. The mobile robot of claim 12, further comprising instructions configured to cause the processor to:
    after moving the mobile robot along the path:
    collect other sensor data from another part of the environment;
    create another diffusion map for the other part of the environment from the other sensor data, the other diffusion map including another plurality of grid points, the other diffusion map defining other transition probabilities between grid points in the other plurality of grid points;
determine another path to make progress from the local destination towards the global destination based on the other transition probabilities; and
control the motion components to move the mobile robot along the other path to another local destination.

14. The mobile robot of claim 12, further comprising instructions configured to cause the processor to formulate a local grid map including the plurality of grid points from the sensor data.

15. The mobile robot of claim 12, wherein instructions configured to cause the processor to determine a path to make progress from a current position of the mobile robot towards the global destination comprise instructions configured to cause the processor to find a neighbor grid point with a smallest diffusion distance from current position.

16. The mobile robot of claim 12, wherein instructions configured to cause the processor to control motion components of the mobile robot to move the mobile robot along the path comprise instructions configured to cause the processor to control the motion components to avoid colliding with the object.

17. The method of claim 1, wherein creating the diffusion map from the sensor data comprises detecting a dynamic obstacle within a perception range of one or more sensors attached to the mobile device and wherein the method further comprises:
assigning an estimated speed of movement to the dynamic obstacle; and
avoiding a collision with the dynamic obstacle based on the estimated speed of movement of the dynamic obstacle.

18. The method of claim 1, wherein creating a diffusion map from the sensor data comprises:
detecting an obstacle within a perception range of one or more sensors attached to the mobile device; and
assigning, to the obstacle, a range of radius values.

19. The method of claim 18, wherein the obstacle is a dynamic obstacle, and the method further comprises:
assigning, to the obstacle, a range of speed values; and
avoiding a collision with the dynamic obstacle based on the range of radius values and the range of speed values.

20. The method of claim 19, further comprising:
capturing sensor data at specified time intervals in accordance with a sampling time; and
avoiding a collision with the dynamic obstacle based on the range of radius values, the range of speed values, and the sampling time.

* * * * *